United States Patent [19]

Ikeda et al.

[11] Patent Number: 5,016,209
[45] Date of Patent: May 14, 1991

[54] FLOATING-POINT ADDITION/SUBTRACTION SYSTEM WITH DIGIT POSITION ALIGNMENT BETWEEN FRACTIONS OF MULTIPLE SETS OF DATA

[75] Inventors: Masayuki Ikeda; Kohichi Ueda, both of Kawasaki, Japan

[73] Assignee: Fujitsu Limited, Kawasaki, Japan

[21] Appl. No.: 206,930

[22] Filed: May 31, 1988

Related U.S. Application Data

[63] Continuation of Ser. No. 678,938, Dec. 6, 1984, abandoned.

[30] Foreign Application Priority Data

Dec. 9, 1983 [JP] Japan ................................. 58-233114
Dec. 29, 1983 [JP] Japan ................................. 58-248422

[51] Int. Cl.$^5$ ............................................. G06F 7/50
[52] U.S. Cl. .................................................... 364/748
[58] Field of Search .......................................... 364/748

[56] References Cited

U.S. PATENT DOCUMENTS 3,551,665 12/1970 Powers et al. ....................... 364/748
4,488,252 12/1984 Vassar ................................. 364/748
4,534,010 8/1985 Kobayashi et al. ................. 364/748
4,562,553 12/1985 Mattedi et al. ...................... 364/748

OTHER PUBLICATIONS

Levine, "Fraction Addition or Subtraction or Comparison Overlap with Characteristic Comparison" *IBM Tech. Disclosure Bulletin* vol. 15, No. 7, Dec. 1972, p. 2162.

*Primary Examiner*—David H. Malzahn
*Attorney, Agent, or Firm*—Armstrong, Nikaido, Marmelstein, Kubovcik & Murray

[57] ABSTRACT

A system of floating-point addition/subtraction for two sets of data includes a first shifting control data generating unit, a second shifting control data generating unit, a first shifting unit, and a second shifting unit. The first shifting control data generating unit generates a shifting control data based on a comparison between the lower bits of the characteristics of the two sets of data. The second shifting unit generates a shifting control data based on a comparison between the entire bits of the characteristics of the two sets of data. The digit position alignment between the fractions of the two sets of data is attained by carrying out the shifting control data generation in parallel with the shifting operation.

7 Claims, 8 Drawing Sheets

| SHIFTING CONTROL DATA | | | | | | INPUT DATA | |
|---|---|---|---|---|---|---|---|
| ENTIRE BITS COMPARISON | | | | LOWER BITS COMPARISON | | DATA NO.1 | DATA NO.2 |
| S(TH) | S(EX) | SA4 | SA3 | SA2 | SA1 | | |
| 0 | 0 | 0 | 0 | 0 | 0 | NO SHIFT | NO SHIFT |
| 0 | 0 | 0 | 0 | 0 | 1 | SHIFT 1 BIT | " |
| 0 | 0 | 0 | 0 | 1 | 0 | SHIFT 2 BITS | " |
| 0 | 0 | 0 | 0 | 1 | 1 | SHIFT 3 BITS | " |
| 0 | 0 | 0 | 1 | 0 | 0 | 4 | " |
| 0 | 0 | 0 | 1 | 0 | 1 | 5 | " |
| 0 | 0 | 0 | 1 | 1 | 0 | 6 | " |
| 0 | 0 | 0 | 1 | 1 | 1 | 7 | " |
| 0 | 0 | 1 | 0 | 0 | 0 | 8 | " |
| 0 | 0 | 1 | 0 | 0 | 1 | 9 | " |
| 0 | 0 | 1 | 0 | 1 | 0 | 10 | " |
| 0 | 0 | 1 | 0 | 1 | 1 | 11 | " |
| 0 | 0 | 1 | 1 | 0 | 0 | 12 | " |
| 0 | 0 | 1 | 1 | 0 | 1 | 13 | " |
| 0 | 0 | 1 | 1 | 1 | 0 | 14 | " |
| 0 | 0 | 1 | 1 | 1 | 1 | 15 | " |
| 0 | 1 | X | X | X | X | MAKE ALL BITS 0 | " |
| 1 | 0 | 0 | 0 | 0 | 0 | NO SHIFT | " |
| 1 | 0 | 0 | 0 | 0 | 1 | " | SHIFT 15 BITS |
| 1 | 0 | 0 | 0 | 1 | 0 | " | SHIFT 14 BITS |
| 1 | 0 | 0 | 0 | 1 | 1 | " | 13 |
| 1 | 0 | 0 | 1 | 0 | 0 | " | 12 |
| 1 | 0 | 0 | 1 | 0 | 1 | " | 11 |
| 1 | 0 | 0 | 1 | 1 | 0 | " | 10 |
| 1 | 0 | 0 | 1 | 1 | 1 | " | 9 |
| 1 | 0 | 1 | 0 | 0 | 0 | " | 8 |
| 1 | 0 | 1 | 0 | 0 | 1 | " | 7 |
| 1 | 0 | 1 | 0 | 1 | 0 | " | 6 |
| 1 | 0 | 1 | 0 | 1 | 1 | " | 5 |
| 1 | 0 | 1 | 1 | 0 | 0 | " | 4 |
| 1 | 0 | 1 | 1 | 0 | 1 | " | 3 |
| 1 | 0 | 1 | 1 | 1 | 0 | " | 2 |
| 1 | 0 | 1 | 1 | 1 | 1 | " | 1 |
| 1 | 1 | X | X | X | X | " | MAKE ALL BITS 0 |

FLOATING-POINT ADDITION/SUBTRACTION SYSTEM WITH DIGIT POSITION ALIGNMENT BETWEEN FRACTIONS OF MULTIPLE SETS OF DATA

This application is a continuation of application Ser. No. 678,938, filed Dec. 6, 1984, now abandoned.

BACKGROUND OF THE INVENTION

1. Field of the Invention

The present invention relates to a system of floating-point addition/subtraction for two sets of data. The system according to the present invention is used in computers for general-purpose work.

2. Description of the Related Art

In general, the realization of the digit position alignment of the fractions, the addition of the fractions, and the normalization are carried out in the addition/subtraction between two sets of data each of which consists of the sign portion, the characteristic (exponent) portion, and the fraction (mantissa) portion.

In the prior art, first, the comparison calculation of the characteristic of two sets of input data is carried out in a comparator to generate shift control data representing the difference between the characteristics and information telling which set of input data is greater than the other set of input data. The generated shift control data is then supplied to shifting circuits in which the shifting operation of the fractions is carried out for realizing the digit position alignment between the fractions of the two sets of input data.

In such a prior art process, the comparison calculation of the characteristics and the shifting operation of the fractions are carried out only in sequence. Thus, there has been a problem in such a prior art process in that it takes a considerable length of time to carry out the processing of the floating-point addition/subtraction for two sets of data.

SUMMARY OF THE INVENTION

The object of the present invention is to provide an improved system of floating-point addition/subtraction for two sets of data in which the shifting of the fractions of the two sets of data, and accordingly, the addition/subtraction between the two sets of data, is carried out at a high speed.

According to the present invention, there is provided a system of floating-point addition/subtraction for two sets of data in which the comparison calculation between the characteristics of the two sets of data is carried out to generate a shifting control data for realizing digit position alignment between the fractions of the two sets of data and the shifting operation is carried out on the basis of the generated shifting control data. The system includes a first shifting control data generating unit for generating a shifting control data based on the comparison between the lower bits of the characteristics of the two sets of data; and a second shifting control data generating unit for generating a shifting control data based on the comparison between the entire bits of the characteristics of the two sets of data. The system also includes a first shifting unit for realizing the digit position alignment between the fractions of the two sets of data based on the shifting control data generated by the first shifting control data generating unit; a second shifting unit for realizing the digit position alignment between the fractions of the two sets of data based on the shifting control data generated by the second shifting control data generating unit; and a calculation unit for carrying out addition based on the outputs from the second shifting unit. In the system, the digit position alignment between the fractions of the two sets of data is attained by carrying out the shifting control data generation in parallel with the shifting operation.

DESCRIPTION OF THE PREFERRED EMBODIMENTS

Figure 1:
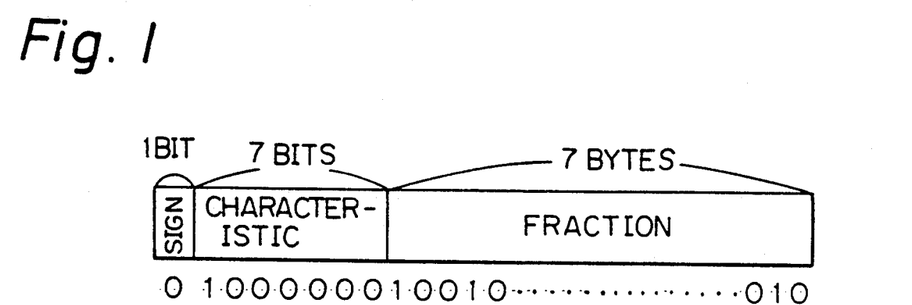
FIG. 1 shows the format of an example of the floating-point representation.
Figure 2:
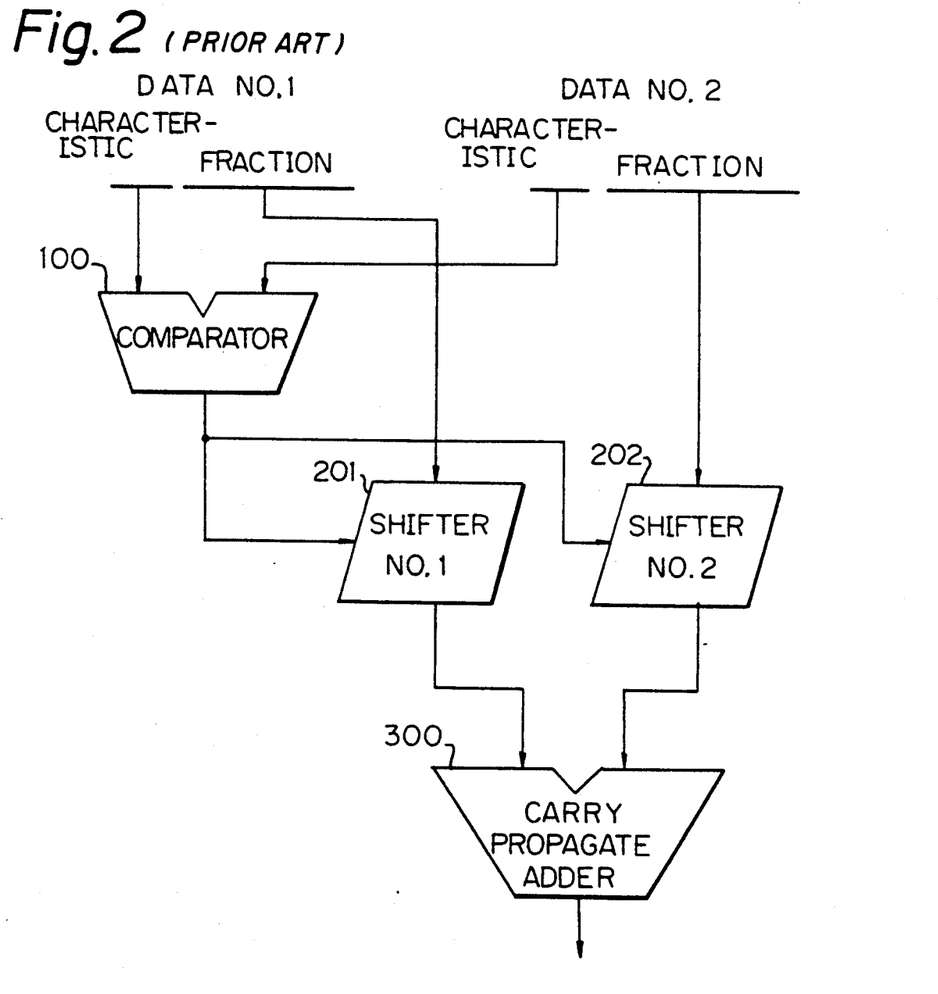
FIG. 2 is a diagram of the circuit for the prior art floating-point calculation.

To further assist with the understanding of the preferred embodiments, the format of an example of the floating-point representation is shown in FIG. 1, and a diagram of the prior art circuit for the calculation by the floating-point representation system is shown in FIG. 2.

In the example shown in FIG. 1, the data, expressed as $+A \times 16^E$, consists of the sign (+) portion of 1 bit, the characteristic or exponent (E) portion of 7 bits, and the fraction or mantissa (A) portion of 7 bytes. Thus, the entire set of data consists of 8 bytes.

The prior art circuit shown in FIG. 2 includes a comparator 100, No. 1 shifter 201, No. 2 shifter 202, and a carry propagate adder 300. The characteristics of the No. 1 set of input data and No. 2 sets of input data are compared in the comparator to produce the shifting control data representing the difference between the characteristics of the No. 1 and No. 2 sets of data and the information telling which set of input data is greater than the other set of input data. The produced shifting control data is supplied to the No. 1 shifter 201 and the No. 2 shifter 202 to cause the shifting operation for aligning the digit position of the fractions of the two sets of input data.

Figure 3:
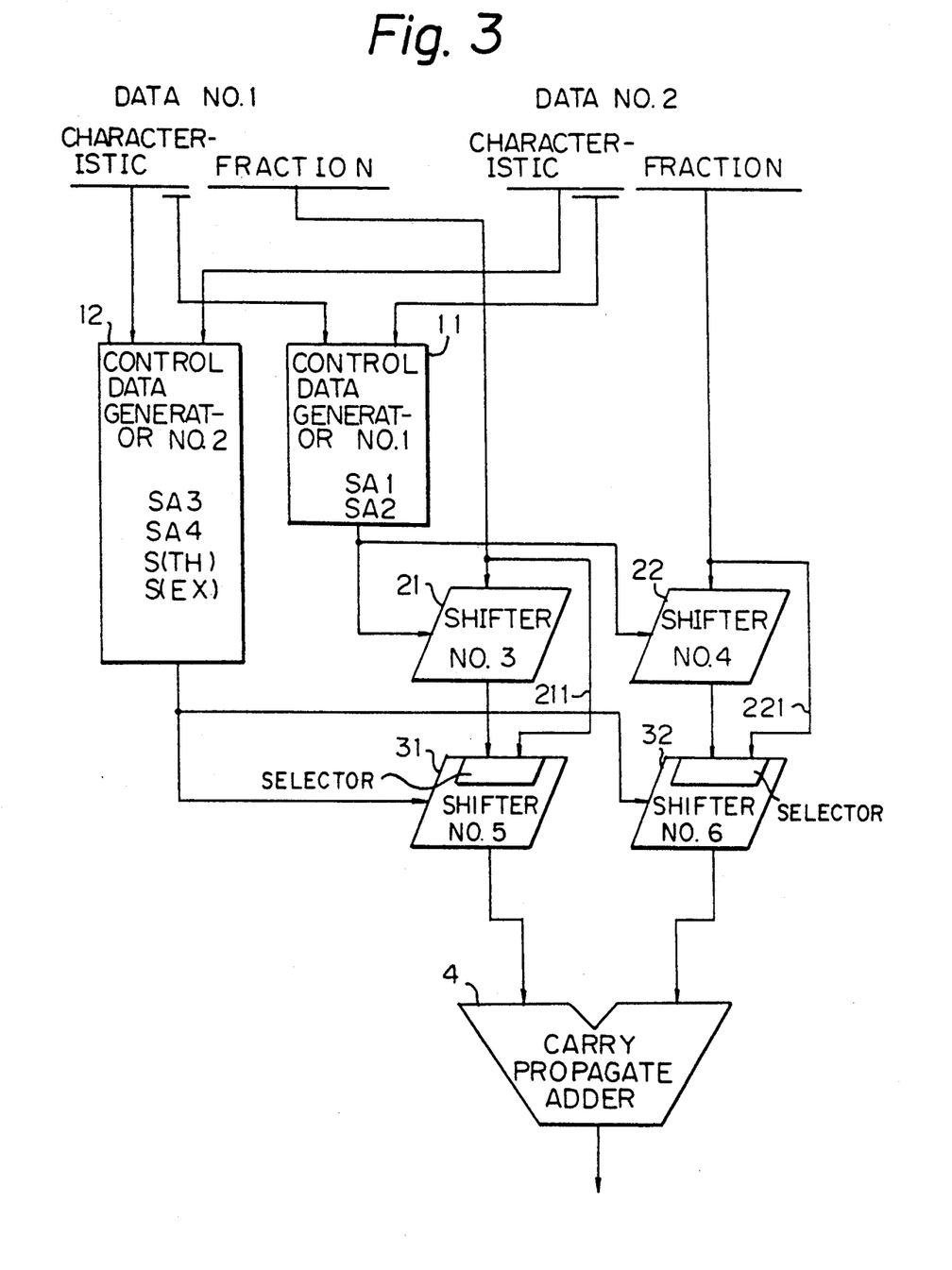
FIG. 3 is a diagram of the circuit for calculation according to an embodiment of the present invention.

FIG. 3 shows a diagram of a circuit for the calculation by the floating-point representation system in which a method is used according to an embodiment of the present invention. The circuit shown in FIG. 3 includes No. 1 control data generator 11 and No. 2 control data generator 12 for producing the shifting control data, No. 3 shifter 21, No. 4 shifter 22, No. 5 shifter 31, No. 6 shifter 32, and a carry propagate adder 4.

Figure 4:
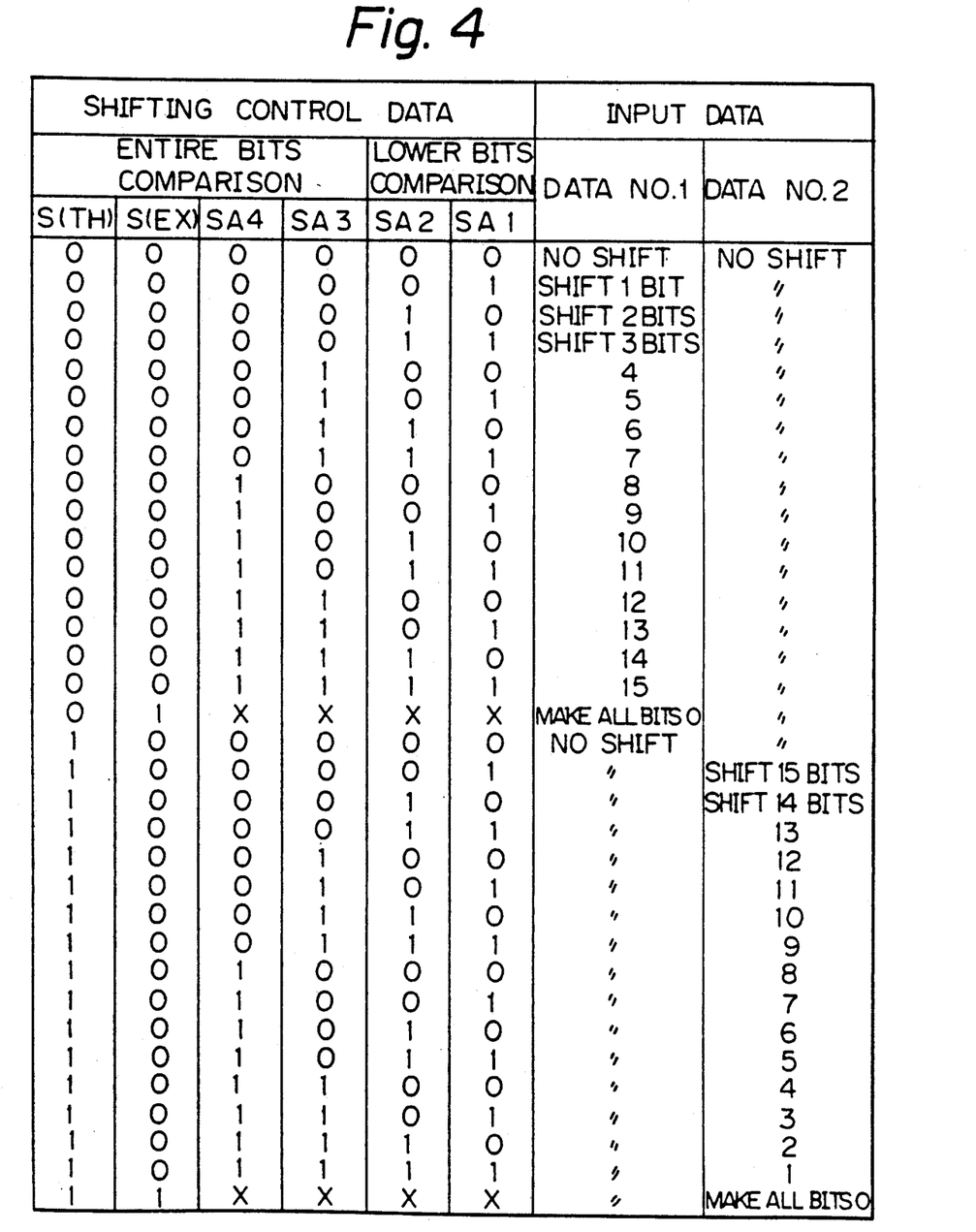
FIG. 4 is a table giving an example of the shifting control data used in the circuit shown in FIG. 3.

The combinations of the shifting control data S(TH), S(EX), SA4, SA3, SA2, and SA1 corresponding to the combinations of the No. 1 set of input data and the No. 2 set of input data are listed in FIG. 4. SA1 and SA2 are the shifting control data produced as the result of comparison between the lower position digits of the two sets of input data. SA3, SA4, S(TH), and S(EX) are the shifting control data produced as the result of comparison between the upper position digits of the two sets of input data. SA1 and SA2 are produced by a relatively low number of logic steps in a relatively short time, while SA3, SA4, S(TH), and S(EX) are produced by a relatively large number of logic steps in a relatively long time. This has led to an idea whereby the production of SA3, SA4, S(TH), and S(EX) is carried out in parallel with the shifting operation using SA1 and SA2, in order to complete the entire operation of the shifting control in a short time.

For carrying out 0 digit position to 15 digit position shifting, the fine shifting control data for 0, 1, 2, and 3 digit position shifting (0, 4, 8, and 12 bit shifting) and the rough shifting control data for 0, 4, 8, and 12 digit position shifting (0, 16, 32, 48 bit shifting) are produced. Any part of the 0 digit position to 15 digit position shifting is carried out by combining the above-described fine and rough shifting control data. Thus, any part of the shifting control data is represented by 2 bits.

S(TH) is the "through" signal which prevents the shifting from being carried out for the fraction of the input data in question having the characteristic which is greater than the characteristic of the other input data. If a calculation is to be made between two sets of input data, the fraction of one input data having the characteristic which is smaller than the characteristic of the other input data should be shifted right, while the fraction of the other input data having the characteristic which is larger than the above-mentioned one input data should be prevented from being shifted.

S(EX) is the "exceed" signal which indicates the shifting of digit positions exceeding 15 digit positions, that is 16 digit positions or more, and accordingly, gives an instruction that the entire bits of the fraction be changed to zero.

Hence, 1 bit is necessary for S(TH) and another 1 bit is necessary for S(EX). Accordingly, 6 bits are necessary for SA1, SA2, SA3, SA4, S(TH), and S(EX).

When the characteristic of DATA No. 1 is smaller than the characteristic of DATA No. 2, the through signal S(TH) is "0", and the shifter 32 is controlled in such the manner that the by-pass 221 is selected and the fraction of DATA No. 2 passes through without being shifted. Conversely, when the characteristic of DATA No. 1 is greater than the characteristic of DATA No. 2, the through signal S(TH) is "1", and the shifter 31 is controlled in such a manner the by-pass 211 is selected and that the fraction of DATA No. 1 passes through without being shifted.

When the exceed signal S(EX) is "1", the fraction of the data to be shifted is controlled to become all "0".

When SA1, SA2, SA3, and SA4 are all "1", a 15 digit position shifting of the fraction is carried out to cause the fraction of the data to be shifted to become all "0".

The circuit shown in FIG. 3 is operated as follows. The shifting control signals SA1 and SA2 for the fine shifting of 0, 1, 2, or 3 digit positions, derived from the lower bits of the characteristics of DATA No. 1 and DATA No. 2, are calculated in the control data generator 11. The time required for the calculation of the shift amount is relatively short. Hence, the shifting control signals SA1 and SA2 are generated in a relatively short time. The generated SA1 and SA2 are immediately supplied to the shifter 21 and the shifter 22 to carry out the fine shifting operation.

During the fine shifting operation, the remainder shifting control signals SA3, SA4 for the rough shifting of 0, 4, 8, or 12 digit position, S(TH), and S(EX), derived from the entire bits of the characteristics of DATA No. 1 and DATA No. 2, are calculated in the control data generator 12. The generated SA3, SA4, S(TH), and S(EX) are supplied to the shifter 31 and the shifter 32 to carry out the rough shifting operation.

When the "through" signal S(TH) is generated from the control data generator 12 and is supplied to the shifters 31 and 32, the data transmitted through the by-pass 211 and the by-pass 221 are selected by the shifter 31 and the shifter 32, irrespective of the fact that the shifting operations by SA1 and SA2 have been carried out in the shifter No. 3 and the shifter No. 4.

Hence, the operation of the generation of the shifting control data in the control data generator 12 for SA3, SA4, S(TH), and S(EX) is carried out in parallel with the shifting operation in the shifters 21 and 22. Accordingly, the input data for the carry propagate adder 4 is obtained in a relatively short time.

Figure 5:
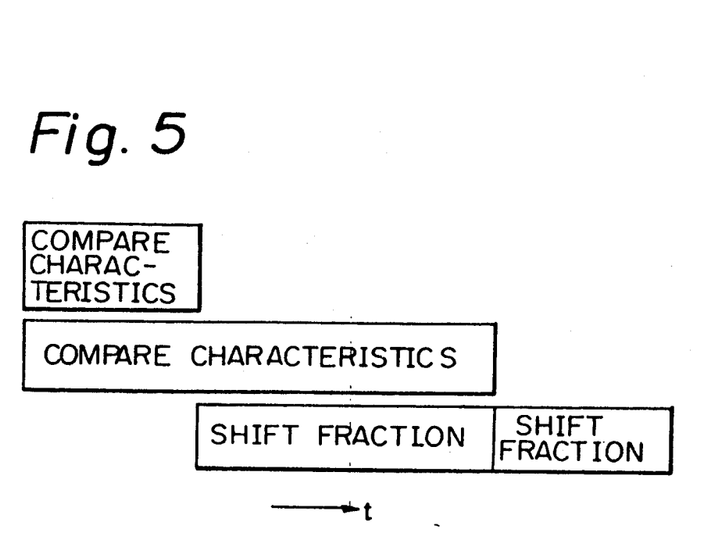
FIG. 5 illustrates the manner of operation of the circuit shown in FIG. 3.
Figure 6:
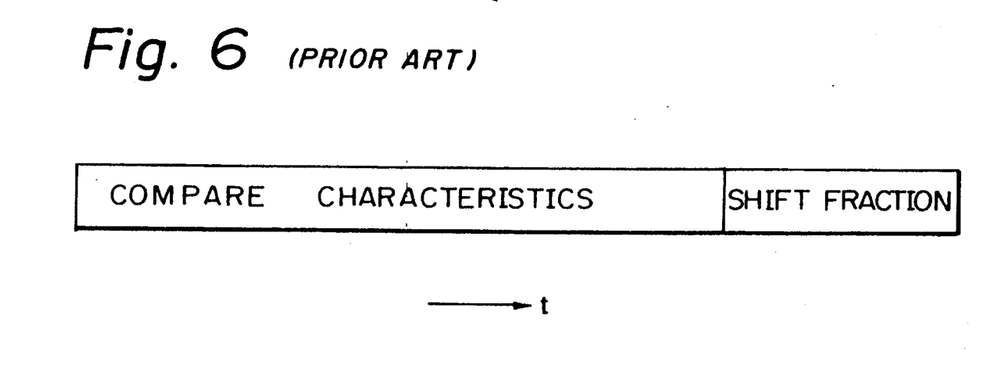
FIG. 6 illustrates the manner of operation of the prior art circuit shown in FIG. 2.

The time chart of the operation in the circuit shown in FIG. 3 is shown in FIG. 5. The time chart of the operation in the corresponding prior art circuit shown in FIG. 2 is shown in FIG. 6. It will be seen from a comparison between FIG. 5 and FIG. 6 that the entire operation of the digit position alignment of the fractions of two sets of data can be carried out in the case of the circuit shown in FIG. 5 in a shorter time than in the case of the circuit shown in FIG. 6.

Figure 7:
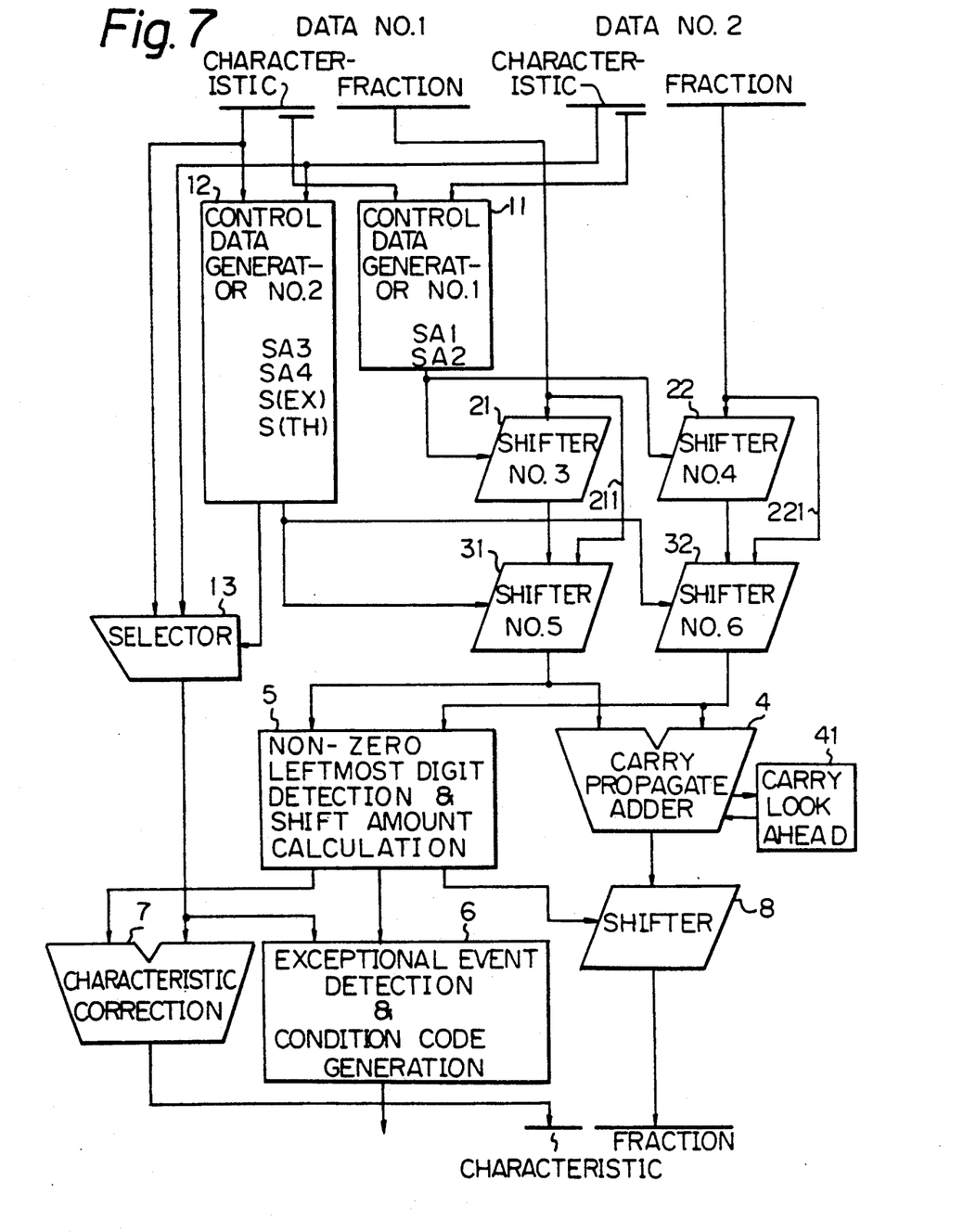
FIG. 7 shows a modified embodiment of the present invention.
Figure 8:
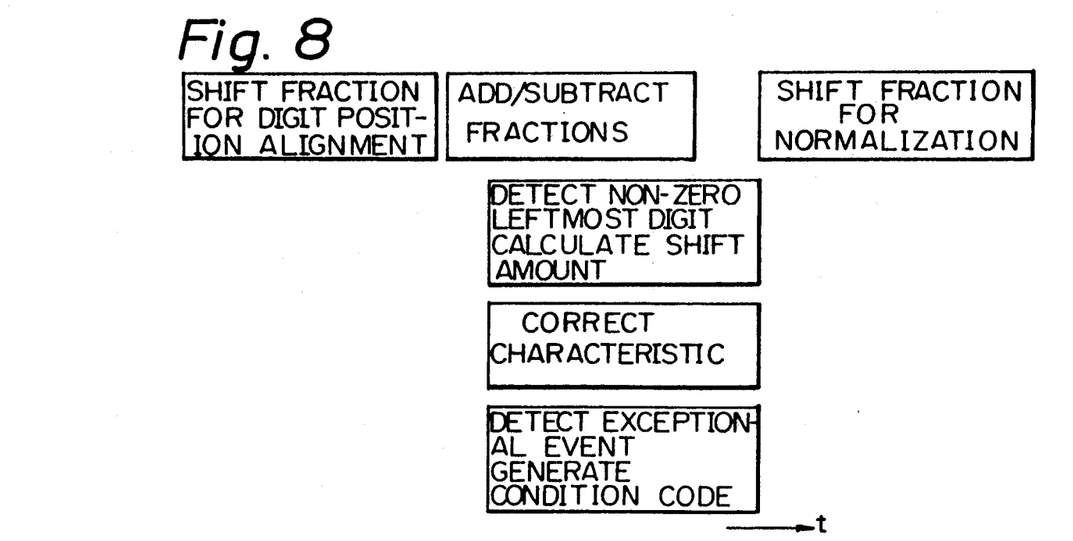
FIG. 8 illustrates the manner of operation of the embodiment shown in FIG. 7.

A modified embodiment of the present invention is shown in FIG. 7. The time chart of the operation in the circuit shown in FIG. 7 is shown in FIG. 8.

The circuit shown in FIG. 7 includes a control data generator 11, a control data generator 12, shifters 21, 22, 31, and 32, a carry propagate adder 4, and a carry look ahead portion 41. The circuit shown in FIG. 7 also includes a selector 13, a non-zero digit detection and shift amount calculation portion 5, an exceptional event detection and condition code generation portion 6, a characteristic correction portion 7, and a shifter 8.

The non-zero leftmost digit detection and shift amount calculation portion 5 detects the non-zero leftmost digits in the result of the addition/subtraction in parallel with the algebraic addition/subtraction treatment carried out in the carry look ahead portion 41 by the time the result of the algebraic addition/subtraction treatment is obtained, and calculates the shift amount necessary for the normalization of the non-zero leftmost digits. With regard to the non-zero digit detection and shift amount calculation portion, see Japanese Patent Application No. 58-103152.

In the invalid digit detection and shift amount calculation portion 5, the detection of non-zero leftmost digit in the upper digits of the intermediate sum and the calculation of the number n of digits of the normalization are carried out.

The exceptional event detection and condition code generation portion 6 receives the data from the non-zero leftmost digit detection and shift amount calculation portion 5 and the selector 13 to generate an exceptional event detection and condition code.

In the exceptional event detection and condition code generation portion 6, the detection of the following exceptional events is carried out.

(1) The result of calculation concerning the fractions is all "0".

(2) An overflow of the characteristic occurs as the result of the normalization. For example, the characteristic goes from "63" to "64".

(3) An underflow of the characteristic occurs as the result of the normalization. For example, the characteristic goes from "−64" to "−66".

In the exceptional event detection and condition code generation portion 6, the generation of the following condition codes is carried out.

(1) "Condition Code 0" is ON, when DATA No. 1 is equal to DATA No. 2.

(2) "Condition Code 1" is ON, when DATA No. 1 is smaller than DATA No. 2.

(3) "Condition Code 2" is ON, when DATA No. 1 is greater than DATA No. 2.

The shifter 8 receives the data from the carry propagate adder and the non-zero leftmost digit detection and shift amount calculation portion 5 and carries out a left shifting of the non-zero leftmost digit in the fraction based on the shift amount for the normalization. This shifting is called post-calculation normalization or post-shifting.

The characteristic correction portion 7 subtracts the left shift amount necessary for the normalization obtained in the non-zero leftmost digit detection and shift amount calculation portion 5 from the characteristic of one of the input DATA Nos. 1 and 2 which has a characteristic greater than the characteristic of the other input DATA, so that the characteristic of the final output data is generated.

The exceptional event detection and condition code generation portion 6 generates the condition code interruption signal with reference to the interruption mask condition and the like. The exceptional event detection and condition code generation portion 6 can be operated in parallel with the operation of the characteristic correction portion 7.

Figure 9:
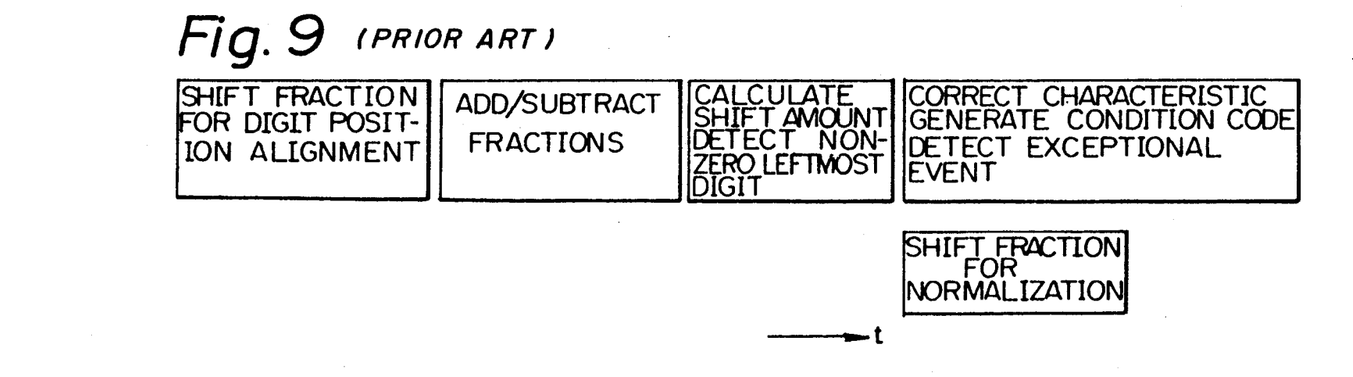
FIG. 9 illustrates the manner of prior art operation corresponding to the operation illustrated in FIG. 8.

The time chart of the operation in the circuit shown in FIG. 7 is shown in FIG. 8. The time chart of the operation in the corresponding prior art circuit is shown in FIG. 9. It will be seen from the comparison between FIG. 8 and FIG. 9 that the entire addition/subtraction operation can be carried out in the case of the circuit shown in FIG. 7 in a shorter time than in the corresponding prior art case.

Figure 10:
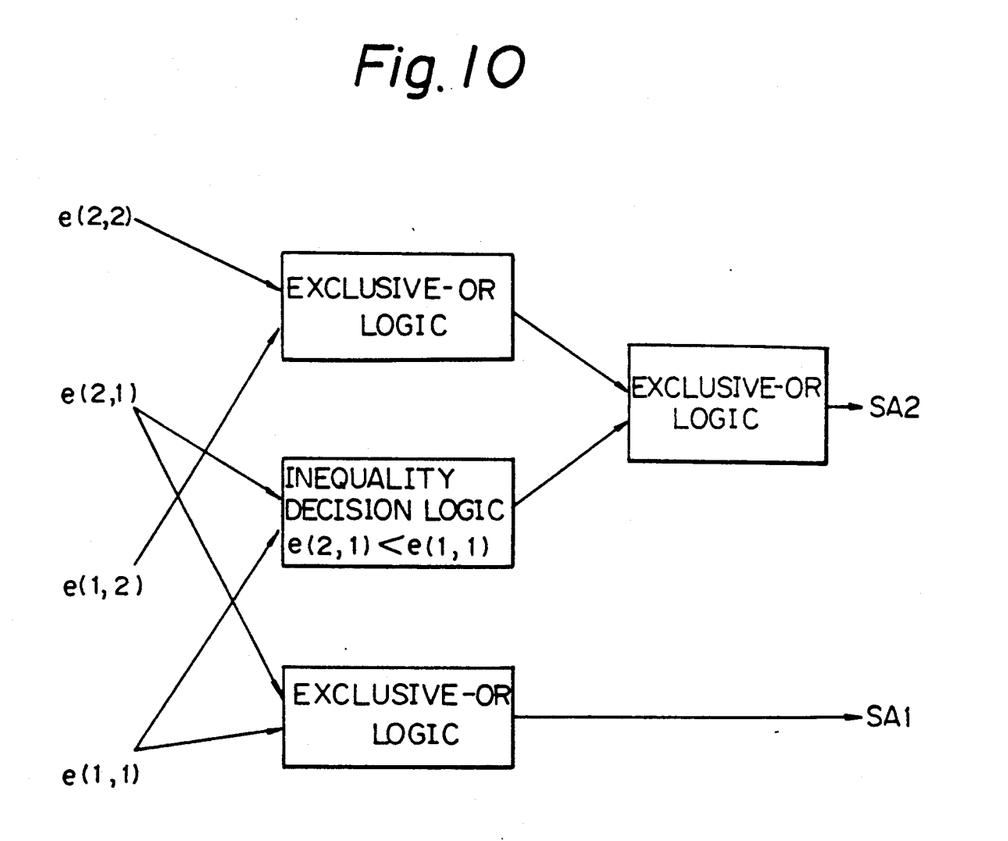
FIGS. 10 and 11 show examples of the circuit for generating the shifting control data used for the circuits shown in FIG. 3 and FIG. 7.
Figure 11:
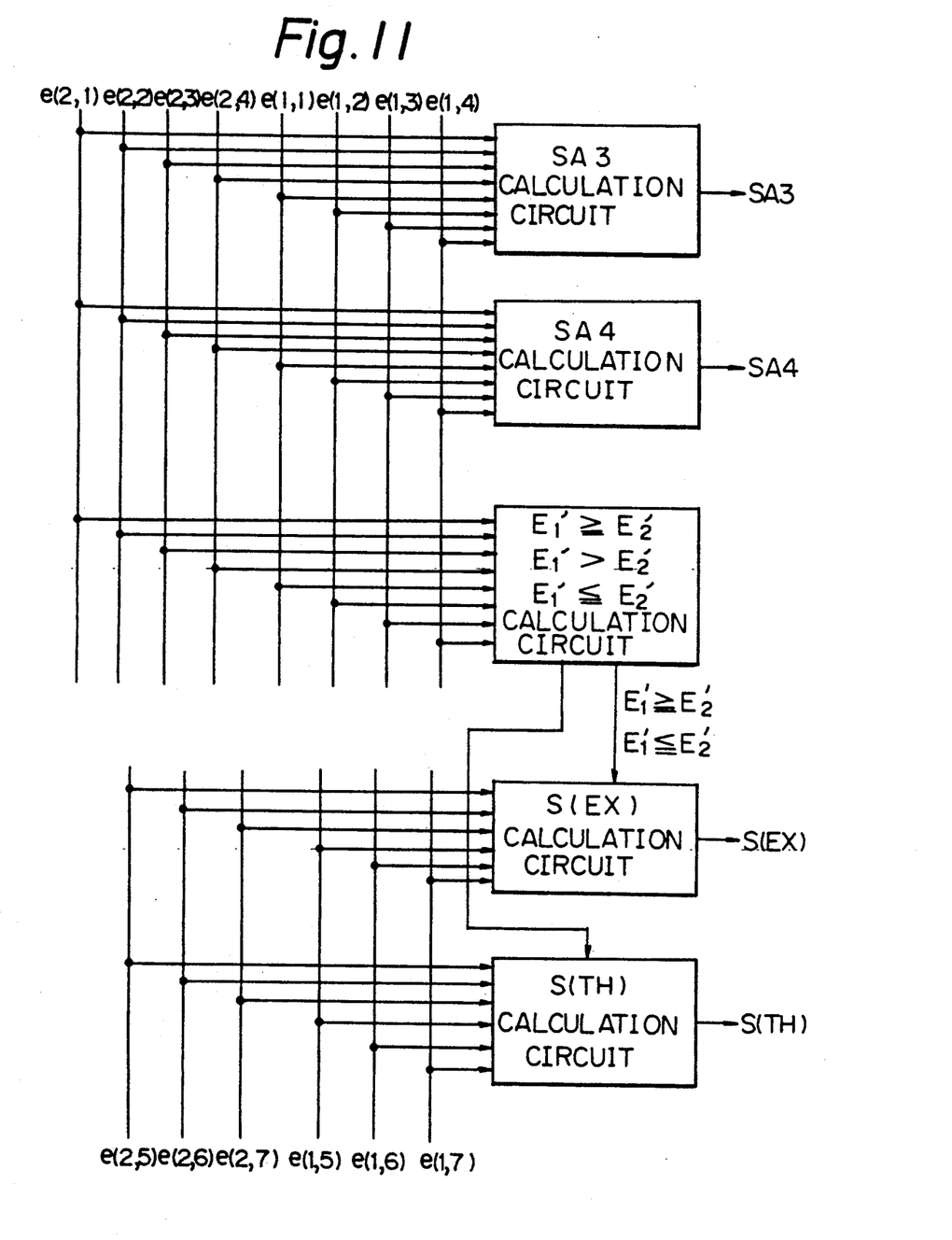

An example of the circuit for generating the signals SA1, SA2, SA3, SA4, S(EX), and S(TH) used for the circuits shown in FIG. 3 and FIG. 7 is shown in FIG. 10 and FIG. 11.

$E_1$ is the characteristic of DATA No. 1 and consists of 7 bits as follows.

$E_1$: e(1, 7), e(1, 6), e(1, 5), e(1, 4), e(1, 3), e(1, 2), e(1, 1)

$E_2$ is the characteristic of DATA No. 2 and consists of 7 bits as follows.

$E_2$: e(2, 7), e(2, 6), e(2, 5), e(2, 4), e(2, 3), e(2, 2), e(2, 1)

SA1 relates to the lowest bit of "$E_2-E_1$". SA2 relates to the second bit from the lowest bit of "$E_2-E_2$". SA3 relates to the third bit from the lowest bit of "$E_2-E_2$". SA4 relates to the fourth bit from the lowest bit of "$E_2-E_2$". S(TH) relates to the condition "$E_2-E_1 \leq -1$". S(EX) relates to the condition "$E_2-E_1 \leq -16$" or "$E_2-E_1 \geq -16$", that is $|E_2-E_1| \geq 16$.

The logic equations of these signals are as follows, where "EOR" indicates the exclusive-OR logic.

$SA1: (e(2,1) = e(1,1))$ $SA2: (e(2,2) \neq e(1,2))EOR(e(2,1) < e(1,1))$ $SA3: (e(2,3) \neq e(1,3))EOR\{(e(2,2) < e(1,2)) +$ $(e(2,2) \leq e(1,2))(e(2,1) < e(1,1))\}$ $SA4 = (e(2,4) \neq e(1,4))EOR\{e(2,3) < e(1,3) +$ $(e(2,3) \leq e(1,3))(e(2,2) < e(1,2)) +$ $(e(2,3) \leq e(1,3))(e(2,2) \leq e(1,2))(e(2,1) < e(1,1))\}$ $S(EX): (E_1 - E_2 \geq 16) + (E_2 - E_1 \geq 16)$ $S(TH): (E_2 - E_1 \leq -1)$ With regard to S(EX), $(E_1-E_2 \geq 16)$ is given as follows:

$(E_1 - E_2 \geq 16) = (e(1,7) > e(2,7))(e(1,6) \geq e(2,6)) +$ $(e(1,7) > e(2,7))(e(1,5) \geq e(2,5)) + (e(1,7) >$ $e(2,7))(E_1' \geq E_2') + (e(1,7) = e(2,7))(e(1,6) > e(2,6))(e(1,5) \geq$ $e(2,5)) + (e(1,7) = e(2,7))(e(1,6) > e(2,6))(E_1' \geq E_2') +$ $(e(1,7) = (e(2,7))(e(1,6) = e(2,6))(e(1,5) > e(2,5))(E_1' \geq E_2')$ where $E_1' \geq E_2' = (e(1,4) > e(2,4)) + (e(1,4) \geq e(2,4))(e(1,3) >$ $e(2,3)) + (e(1,4) \geq e(2,4))(e(1,3) \geq e(2,3))(e(1,2) > e(2,2)) +$ $(e(1,4) \geq e(2,4))(e(1,3) \geq e(2,3))(e(1,2) \geq e(2,2))(e(1,1) \geq e(2,1))$ With regard to S(EX), $(E_2-E_1 \geq 16)$ is given similarly as in the case of $(E_1-E_2 \geq 16)$, except that numeral "1" is replaced by numeral "2" and numeral "2" is replaced by numeral "1".

With regard to S(TH), $(E_2-E_1 \leq -1)$ is given as follows:

$(E_2 - E_1 \leq 1) = (e(1,7) > e(2,7)) + (e(1,7) \geq e(2,7))(e(1,6) >$ $e(2,6)) + (e(1,7) \geq e(2,7))(e(1,6) \geq e(2,6))(e(1,5) > e(2,5)) +$ $(e(1,7) \geq e(2,7))(e(1,6) \geq e(2,6))(e(1,5) \geq e(2,5))(E_1' > E_2')$ where $E_1' > E_2' = (e(1,4) > e(2,4)) + (e(1,4) \geq e(2,4))(e(1,3) >$ $e(2,3)) + (e(1,4) \geq e(2,4))(e(1,3) \geq e(2,3))(e(1,2) > e(2,2)) +$ $(e(1,4) \geq e(2,4))(e(1,3) \geq e(2,3))(e(1,2) \geq e(2,2))(e(1,1) > e(2,1))$.

We claim:

1. A system of floating-point addition/subtraction for two sets of data in which a comparison calculation between characteristics of said two sets of data is carried out to generate a shifting control information for realizing digit position alignment between fractions of said two sets of data and a shifting operation is carried out on the basis of said generated shifting control information, said system comprising:

a first shifting control data generating means for generating a first shifting control data based on a comparison between only low significant bits of the characteristics of said two sets of data;

a second shifting control data generating means for generating a second shifting control data based on a comparison between the entire bits of the characteristics of said two sets of data;

a first shifting means for realizing a first digit position alignment between the fractions of said two sets of data based on the first shifting control data generated by said first shifting control data generating means, the comparison in said second shifting control data generating means for generating said second shifting control data being carried out in parallel with the first digit position alignment operation in said first shifting means based on said first shifting control data, so that the speed of the total operation of the shifting control data generations and the shifting in the system is increased;

a second shifting means for realizing a second digit position alignment between the fractions of said two sets of data based on the second shifting control data generated by said second shifting control data generating means; and a calculating means for carrying out addition based on the outputs from said second shifting means.

2. The system of claim 1, further comprising:

a shift amount calculation means for receiving the outputs of said second shifting measn, detecting the non-zero leftmost digit of said outputs, and calculating the shift amount of said outputs;

correction means, responsive to a characteristic of one of said sets of data and an output of said shift amount calculation means, for carrying out a characteristic correction; and condition code generation means responsive to a characteristic of one of said sets of data and output of said shift amount calculation means for detecting an exceptional event and generating a condition code.

3. The system of claim 1, wherein said first shifting means comprises a first shifter for receiving the fraction portion of one of said sets of data and the shifting control data from said first shifting control data generating means, and a second shifter for receiving the fraction portion of the other of said sets of data and the shifting control data from said first shifting control data generating means.

4. The system of claim 3, further comprising a bypass route provided around each shifter in said first shifting means.

5. The system of claim 3, wherein said second shifting means comprises a third shifter for receiving the fraction portion of one of said sets of data, the output of said first shifter, and the output of said second shifting control data generating means, and a fourth shifter for receiving the fraction portion of the other of said sets of data, the output of said second shifter, and the output of said second shifting control data generating means.

6. The system of claim 5, further comprising:

a bypass route provided around each shifter in said first shifting means; and a selection means, provided in an input portion of each shifter of said second shifting means, for selecting between the output of a shifter in said first shifting means and a corresponding bypass route.

7. The system of claim 6, wherein said selection means is provided for selecting the bypass route of said first and second shifters in response to a received second shifting control data, in the side of the mantissa which has a greater characteristic, and for making the shift amount in the second shifting means to be zero, so that a transmission is carried out in a through manner.

* * * * *